United States Patent
Terauchi et al.

(10) Patent No.: US 8,992,368 B2
(45) Date of Patent: Mar. 31, 2015

(54) DRIVE APPARATUS AND CONSTRUCTION MACHINE PROVIDED WITH SAME

(75) Inventors: Kenichi Terauchi, Hiroshima (JP); Masatsugu Hamasaki, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 0 days.

(21) Appl. No.: 13/885,353

(22) PCT Filed: Nov. 17, 2011

(86) PCT No.: PCT/JP2011/006405
§ 371 (c)(1),
(2), (4) Date: May 14, 2013

(87) PCT Pub. No.: WO2012/070205
PCT Pub. Date: May 31, 2012

(65) Prior Publication Data
US 2013/0231210 A1 Sep. 5, 2013

(30) Foreign Application Priority Data
Nov. 22, 2010 (JP) .................................. 2010260303

(51) Int. Cl.
*F16H 57/04* (2010.01)
*E02F 9/12* (2006.01)
(Continued)

(52) U.S. Cl.
CPC ............ *F16H 57/0434* (2013.01); *E02F 9/123* (2013.01); *E02F 9/126* (2013.01);
(Continued)

(58) Field of Classification Search
CPC ..... F16H 57/04; F16H 57/15; F16H 57/0416; F16H 57/0417; F16H 1/46; H02K 9/22; H02K 7/116; E02F 9/123; E02F 9/126

USPC ........ 475/4, 5, 159, 160, 161, 219, 330, 338, 475/339; 74/606 R
See application file for complete search history.

(56) References Cited

U.S. PATENT DOCUMENTS

| | | | | |
|---|---|---|---|---|
| 4,006,804 A | * | 2/1977 | Fehr | 188/293 |
| 5,759,128 A | * | 6/1998 | Mizutani et al. | 475/149 |
| 2011/0011203 A1 | * | 1/2011 | Yamamoto et al. | 74/606 A |

FOREIGN PATENT DOCUMENTS

| | | |
|---|---|---|
| CN | 101138964 A | 3/2008 |
| CN | 101858423 A | 10/2010 |
| JP | 55-112457 | 8/1980 |
| JP | 2003-240107 A | 8/2003 |
| JP | 2007 120510 | 5/2007 |
| JP | 2010 249156 | 11/2010 |

OTHER PUBLICATIONS

JP4504899B (Machine Translation)—Ikegami et al.*
(Continued)

*Primary Examiner* — Michael Mansen
*Assistant Examiner* — Tinh Dang
(74) *Attorney, Agent, or Firm* — Oblon, McClelland, Maier & Neustadt, L.L.P.

(57) ABSTRACT

A drive apparatus for a construction machine includes: a motor having a motor shaft; a speed reducer unit having a speed reducer output shaft and a casing and reducing speed of rotation force of the motor, and transmitting the force to an upper slewing body; and a cooler formed with a coolant path through which liquid or gas for cooling lubricating oil inside the casing passes as a cooling medium, wherein the motor and the speed reducer unit are provided in a row in an apparatus-axis direction such that the motor shaft and the speed reducer output shaft are arranged along the same line, and the cooler is provided in a row with the speed reducer unit in the apparatus-axis direction in a state where at least a part of the cooler is immersed in the lubricating oil, so as to enable heat exchange with the lubricating oil.

17 Claims, 8 Drawing Sheets

(51) Int. Cl.
*H02K 9/22* (2006.01)
*H02K 7/116* (2006.01)
*F16H 1/46* (2006.01)

(52) U.S. Cl.
CPC ........ *F16H57/0417* (2013.01); *F16H 57/0486* (2013.01); *H02K 9/22* (2013.01); *F16H 57/0416* (2013.01); *H02K 7/116* (2013.01); *F16H 1/46* (2013.01)
USPC .................................. 475/159; 475/4; 475/5

(56) References Cited

OTHER PUBLICATIONS

International Search Report Issued Dec. 20, 2011 in PCT/JP11/006405 filed Nov. 17, 2011.

Office Action issued Nov. 11, 2014 in Japanese Patent Application No. 2010-260303.

Office Action issued Jan. 16, 2015, in Chinese Patent Application No. 201180056344.9 (with partial English-language translation/summary).

\* cited by examiner

DRIVE APPARATUS AND CONSTRUCTION MACHINE PROVIDED WITH SAME

TECHNICAL FIELD

The present invention relates to a drive apparatus for reducing speed of rotation force of a hydraulic or electric motor serving as a drive source with an oil-filled speed reducer unit, and transmitting the reduced rotation force to a driven portion such as an upper slewing body, in a construction machine such as a hydraulic shovel.

BACKGROUND ART

Taking a slewing drive apparatus for a shovel as an example, background art will be described.

A shovel includes a crawler-type lower propelling body, an upper slewing body rotatably mounted, around a shaft vertical to the ground, on the lower propelling body, and a work attachment mounted on this upper slewing body.

The shovel further includes a slewing drive apparatus rotating the upper slewing body. This slewing drive apparatus includes a hydraulic or electric motor serving as a drive source, and a speed reducer unit reducing speed of rotation force of this motor with a gear speed reduction mechanism and transmitting the reduced rotation force to the upper slewing body, that is, the driven portion.

The motor has a motor shaft, and the speed reducer unit has a speed reducer output shaft connected to the motor shaft. The motor and the speed reducer unit are provided in a row in an axial direction of the slewing drive apparatus (hereinafter referred to as an apparatus-axis direction) such that both center axes (the motor shaft and the speed reducer output shaft) are located along the same line. Additionally, the motor and the speed reducer unit are mounted to an upper frame in such a vertical arrangement that the motor is located at a top.

The speed reducer unit is at least a single-stage planetary gear mechanism including a sun gear, a planetary gear, and a ring gear, for example. Output of this speed reducer unit is transmitted to the upper slewing body through a pinion provided on the speed reducer output shaft, and a slewing gear provided on a lower frame of the lower propelling body.

Lubricating oil for lubricating a gear mechanism such as the planetary gear mechanism is injected in the speed reducer unit. A temperature of this lubricating oil increases by heat generated by the slewing drive apparatus (speed reducer unit). Therefore, the slewing drive apparatus is provided with a cooling means for cooling the lubricating oil.

For example, Patent Document 1 describes a technique of providing a coolant path in a casing of a speed reducer unit as the cooling means, and cooling lubricating oil from an outer periphery by flowing a cooling medium such as water and oil in this coolant path.

However, according to the technique described in Patent Document 1, there are the following problems.

(I) A jacket structure, in which the coolant path is provided so as to have the size in a range of a thickness of a peripheral wall of the casing, is employed. Therefore, the thickness of the peripheral walls of the casing is required to increase, and a diameter of the casing increases.

Accordingly, a maximum diameter of the drive apparatus increases, and a space occupied by the drive apparatus in this diameter direction increases. Therefore, particularly under a situation in which many apparatuses are densely placed in a small space like the slewing drive apparatus for the shovel, the layout of the apparatuses becomes difficult.

(II) In a case of the slewing drive apparatus, a shaft support portion provided on a lower end of the speed reducer unit is bolted on the upper frame from above. Here, according to the technique described in Patent Document 1, the casing of the speed reducer unit increases in diameter by providing the coolant path. Therefore, a tightening tool such as a wrench is difficult to enter due to interference of this casing, and tightening or loosening work of a bolt for mounting the shaft support portion becomes troublesome.

(III) The lubricating oil inside the casing is cooled only from an outer periphery side of the casing. That is, only one surface (inner surface) of the coolant path (casing) contributes to cooling. Therefore, a cooling effect is weak.

(IV) The coolant path is formed so as to have the size in the thickness range of the casing. Therefore, as described in Patent Document 1, it is necessary to employ a particular molding method such as molding using a core for the coolant path. Thus, the manufacturing cost of the casing increases.

Patent Document 1: Japanese Patent Publication No. 4504899

SUMMARY OF THE INVENTION

An object of the present invention is to provide a drive apparatus in which a cooling effect of lubricating oil is enhanced and a manufacturing cost can be reduced while the size is small in a diameter direction, and a construction machine provided with the same.

In order to solve the problems, the present invention provides a drive apparatus for a construction machine that includes a hydraulic or electric motor having a motor shaft and serving as a drive source, a speed reducer unit having a speed reducer output shaft for receiving rotation force from the motor shaft and transmitting this rotation force to a driven portion, and a casing having lubricating oil injected therein, and transmitting the rotation force of the motor to the driven portion while reducing speed of the rotation force, and a cooler formed with a coolant path through which liquid or gas for cooling the lubricating oil passes as a cooling medium, wherein the motor and the speed reducer unit are provided in a row in an apparatus-axis direction such that the motor shaft and the speed reducer output shaft are arranged along a same line, and the cooler is provided in a row with the speed reducer unit in the apparatus-axis direction in a state where at least a part of the cooler is immersed in the lubricating oil, so as to enable heat exchange with the lubricating oil.

Furthermore, the present invention provides a construction machine including the drive apparatus, and a driven portion which is driven by receiving force transmitted through the speed reducer unit.

According to the present invention, the cooling effect of the lubricating oil is enhanced and the manufacturing cost can be reduced while the size is small in the diameter direction.

BEST MODE FOR CARRYING OUT THE INVENTION

With reference to the attached drawings, embodiments of the present invention will be hereinafter described. The following embodiments each are an embodied example of the present invention, and do not restrict the technical scope of the present invention.

An application item of each of the following embodiments is a slewing drive apparatus for a shovel.

However, the present invention is also applicable to other drive apparatuses in which a motor and a speed reducer unit are arranged in a row in an apparatus-axis direction such that a motor shaft of the motor and a speed reducer output shaft of the speed reducer unit are arranged along the same line, and lubricating oil is injected into a casing of the speed reducer unit. Specifically, the present invention is applicable, for example, to a propelling drive apparatus of a lower propelling body or a drive apparatus of a winch. Furthermore, the present invention is also applicable to construction machines other than the shovel.

In the following description, a vertically-mounted drive apparatus in which the motor and the speed reducer unit are vertically located is taken as an example. However, the present invention is also applicable to a horizontally-mounted drive apparatus in which the motor and the speed reducer unit are located horizontally.

First Embodiment

See FIG. 1 to FIG. 4

Figure 1:
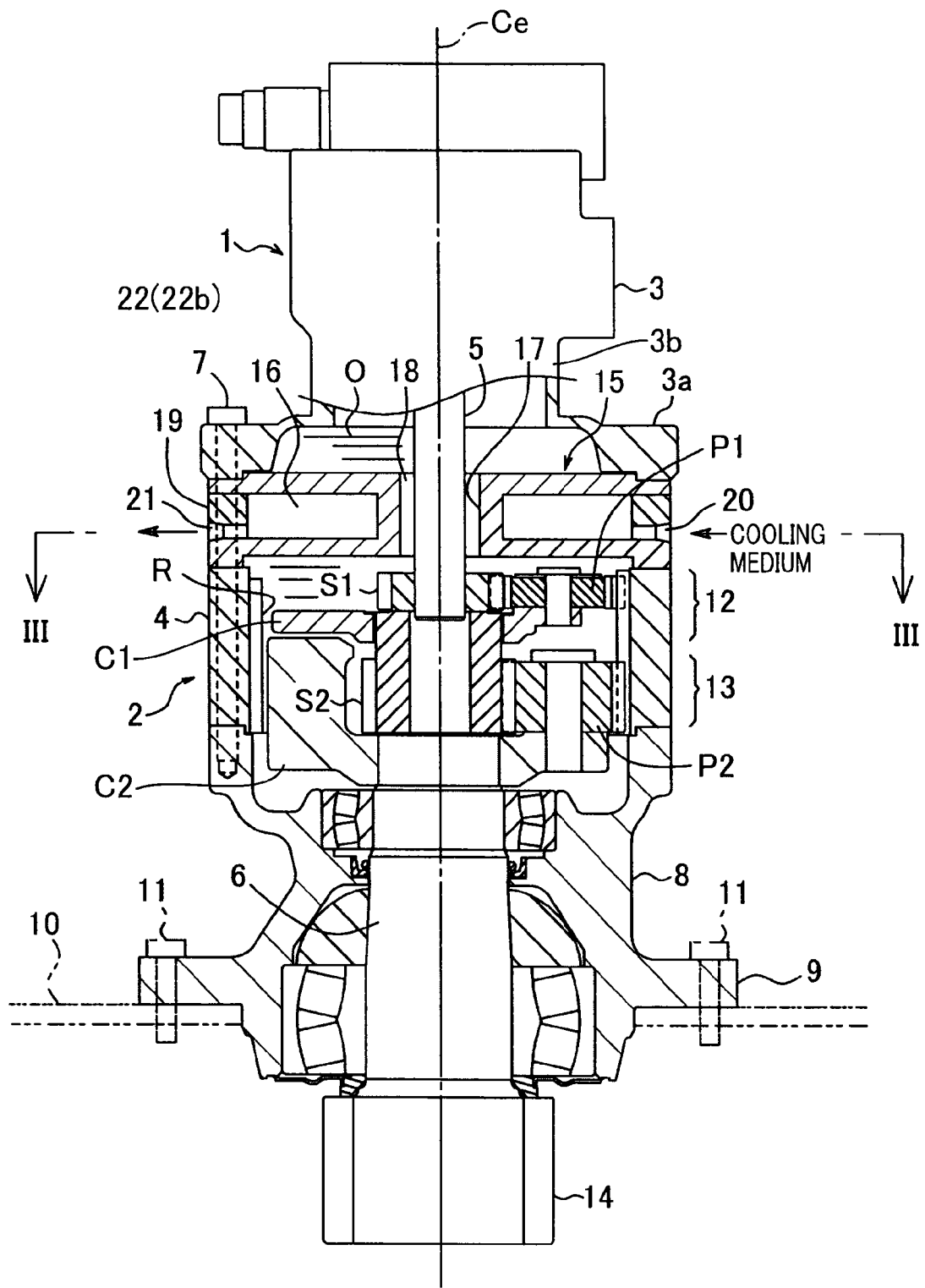
FIG. 1 is a partial cross-sectional side view showing a first embodiment of the present invention.

A slewing drive apparatus shown in FIG. 1 includes a hydraulic or electric motor (generally, hydraulic motor) 1 serving as a drive source, a speed reducer unit 2 reducing speed of rotation force of this motor 1 and transmitting the rotation force to an upper slewing body as a driven portion, and a cooler 15 provided between the motor 1 and the speed reducer unit 2.

The motor 1 includes a motor housing 3, and a motor shaft 5 protruding from the motor housing 3. The motor housing 3 includes a cylindrical housing body 3b, and a flange 3a protruding from a lower end of the housing body 3b to an outer periphery.

The speed reducer unit 2 includes at least single-stage planetary gear mechanisms (two-stage planetary gear mechanisms in FIG. 1, and hereinafter described as a case of the two-stage planetary gear mechanisms) 12 and 13, a casing 4, in which the respective planetary gear mechanisms 12 and 13 are housed, and into which lubricating oil O is injected, a speed reducer output shaft 6 connected to the respective planetary gear mechanisms 12 and 13 and protruding from the casing 4, and a shaft support portion 8 rotatably supporting the speed reducer output shaft 6.

The aforementioned motor 1 and speed reducer unit 2 are arranged in a row in an apparatus-axis direction (vertical direction) such that the motor shaft 5 and the speed reducer output shaft 6 are arranged along the same center line Ce.

Specifically, the motor 1 and the speed reducer unit 2 are mounted to a construction machine in such a vertically arranged state that the motor 1 is located at a top and the motor 1 and the speed reducer unit 2 are provided in a row in the apparatus-axis direction. The flange 3a provided on a lower end of the motor housing 3, and an upper end of the casing 4 are detachably connected to each other with a plurality of connecting bolts 7.

The shaft support portion 8 is provided on a lower end of the speed reducer unit 2 (below the casing 4), and has therein a bearing rotatably supporting the speed reducer output shaft 6. This shaft support portion 8 is provided with a mounting flange 9 protruding from a lower portion thereof to an outer periphery. The mounting flange 9 can be mounted to an upper frame 10 of the upper slewing body with a plurality of mounting bolts 11.

The casing 4 houses the two-stage planetary gear mechanisms 12 and 13 arranged coaxially. Furthermore, the lubricating oil O is injected into the casing 4 over the substantially whole length of the casing 4. More specifically, the lubricating oil O is injected into a range from a bottom surface of the casing 4 (boundary portion between the shaft support portion 8 and the casing 4) to the flange 3a of the aforementioned motor 1.

The respective planetary gear mechanisms 12 and 13 reduce the speed of the rotation force of the motor 1 and transmit the rotation force to the upper frame 10 (upper slewing body) as the driven portion. Specifically, the respective planetary gear mechanisms 12 and 13 include sun gears S1 and S2, carriers (also called spiders) C1 and C2, pluralities of planetary gears P1 and P2 provided around the sun gears S1 and S2 through the carriers C1 and C2, and a ring gear R provided on an inner periphery of the casing 4. Then, the respective planetary gear mechanisms 12 and 13 make the planetary gears P1 and P2 revolve while making the planetary gears P1 and P2 rotate on their own axes, thereby reducing the speed of the rotation of the motor 1. The rotation force, which is reduced in speed, of the motor 1 is transmitted to the speed reducer output shaft 6, and transmitted to the upper frame 10 through a pinion 14 provided on a lower end of the speed reducer output shaft 6 and a slewing gear (ring gear: not shown) meshing with this pinion 14.

In this slewing drive apparatus, the cooler 15 for cooling the lubricating oil O in the casing 4 is provided between the motor 1 and the speed reducer unit 2.

Figure 2:
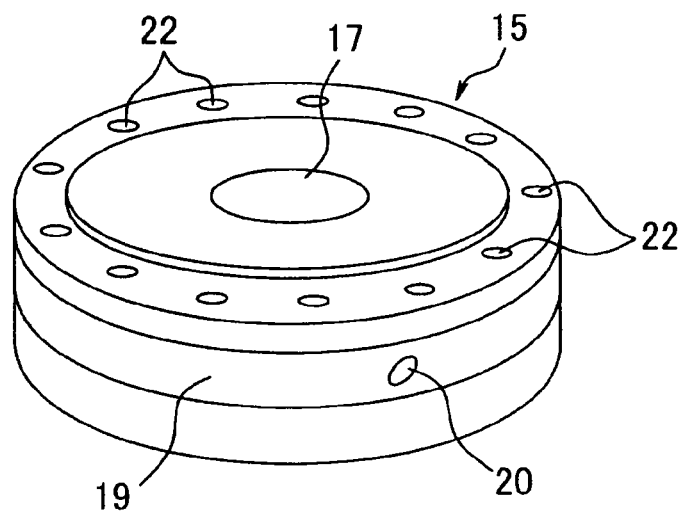
FIG. 2 is an enlarged perspective view showing a cooler shown in FIG. 1.
Figure 3:
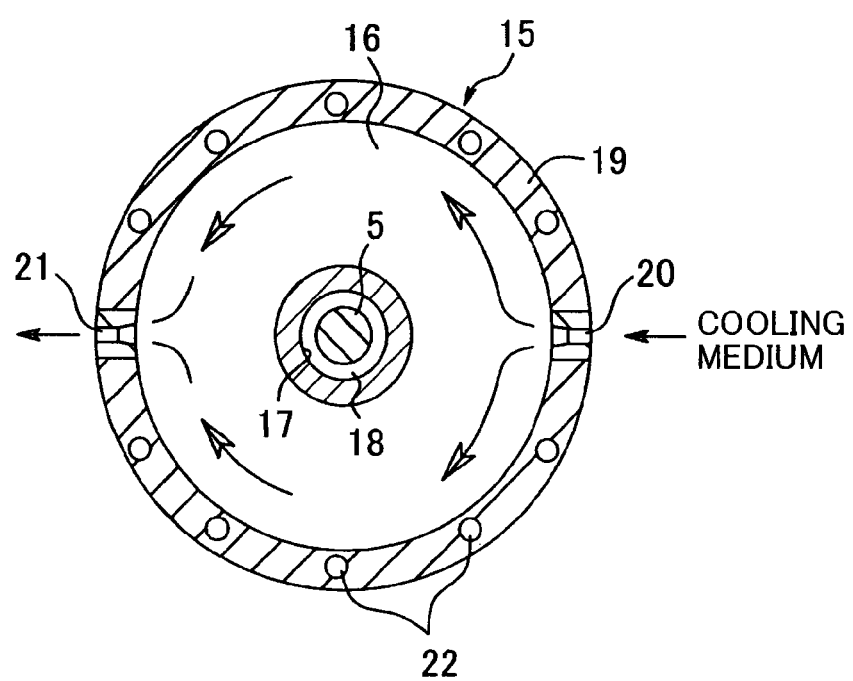
FIG. 3 is a sectional view taken along a line III-III in FIG. 1.

The cooler 15 is a flattened circular box body having therein a coolant path 16, through which liquid or air passes as a cooling medium, as shown in FIGS. 1 to 3. Furthermore, the cooler 15 is formed with a center hole (communication hole) 17 through which the motor shaft 5 can pass. The center hole 17 communicates between spaces on both side of the apparatus-axis direction of the cooler 15 so as to allow the lubricating oil O to circulate in a central portion of the cooler 15. Furthermore, an outer peripheral wall (ring member 19 described later) of the cooler 15 is formed with a plurality of bolt through holes (connecting portions) 22 along the vertical direction in a range of a thickness thereof. The respective bolt through holes 22 allow the connecting bolts 7 to be inserted therethrough. Therefore, the cooler 15 is detachably attached to the motor 1 (flange 3a) and the speed reducer unit 2 (casing 4) with the connecting bolts 7 in a state where the motor shaft 5 passes through the center hole 17.

Here, the center hole 17 is formed so as to have a diameter larger than that of the motor shaft 5. Therefore, a clearance gap between an inner surface of the center hole 17 and the motor shaft 5 functions as a communication path 18 through which the lubricating oil O circulates in spaces on both upper and lower sides of the cooler 15.

Furthermore, the ring member 19 configuring the outer peripheral wall of the cooler 15 is formed with an inlet 20 and an outlet 21 communicating between the inside and the outside of the ring member 19. The inlet 20 and the outlet 21 are provided in symmetric positions at 180° about the center line Ce.

The inlet 20 is connected to a coolant supply pipe (outside the drawing). Similarly, the outlet 21 is connected to a coolant discharge pipe (outside the drawing). The cooling medium (water or oil) is supplied to the coolant path 16 through the inlet 20. On the other hand, the cooling medium after heat exchange is discharged from the coolant path 16 through the outlet 21.

The cooler 15 is mounted between the motor 1 and the speed reducer unit 2 in a state of being partially immersed in the lubricating oil O. Specifically, the cooler 15 is mounted to the motor 1 and the speed reducer unit 2 in a state where an outer peripheral surface of the ring member 19 is flush with an outer peripheral surface of the casing 4. In this mounting state, both of an upper surface and a lower surface of the cooler 15 are in contact with the lubricating oil O. Therefore, the lubricating oil O in the casing 4 is cooled by the cooling medium supplied to the cooler 15.

According to this configuration, the following function effects can be obtained as compared with a conventional jacket structure in which a coolant path is provided on a peripheral wall of a casing.

(i) With respect to a cooling effect, the cooler 15 is partially immersed in the lubricating oil O, so that heat exchange with the lubricating oil O can be performed on the both side surfaces in the apparatus-axis direction of the cooler 15. Therefore, a basically high cooling effect can be obtained.

Furthermore, the cooler 15 is provided with the communication path 18 for communicating between the spaces on the both sides in the vertical direction of the cooler 15. Therefore, it is possible to spread the lubricating oil O between the spaces on the both sides in the vertical direction of the cooler 15. Thus, lubrication of the speed reducer unit 2 can be inhibited from being blocked, and the cooling effect by the cooler 15 can be further enhanced.

(ii) With respect to the apparatus size, the cooler 15 is provided in a row in the apparatus-axis direction between the motor 1 and the speed reducer unit 2. Thus, the cooler 15 can be inhibited from protruding to a side of the outer periphery with respect to the speed reducer unit 2, and a maximum diameter of the drive apparatus can be reduced.

Accordingly, a space occupied by the apparatus as viewed from an axial direction (above) can be reduced. Particularly, in a situation where there is not an enough space in the diameter direction while there is an enough constant space in the vertical direction as in a case where the slewing drive apparatus is provided in the shovel, the degree of freedom of layout of apparatuses is improved.

Furthermore, the cooler 15 does not protrude from the speed reducer unit 2 to the outer periphery, and therefore there is no risk of disrupting tightening operation and loosening operation of the respective mounting bolts 11 with respect to the upper frame 10.

Moreover, the planetary gear mechanisms 12 and 13 that are compact in an axial direction are used as the speed reduction mechanisms of the speed reducer unit 2. Therefore, even when the cooler 15 is provided on an intermediate portion in the apparatus-axis direction, the whole apparatus length does not become extremely large.

(iii) With respect to the cost, assembly and the like, first, the cooler 15 has a simple box structure, and therefore manufacture of the cooler 15 is simple and the manufacturing cost can be reduced. In the conventional jacket structure, it is necessary to manufacture a casing by a troublesome molding method such as molding using a core.

Second, assembling and detaching of the cooler 15 are easily performed. Specifically, in a state where the motor shaft 5 passes through the center hole 17 of the cooler 15, the outer peripheral portion (ring member 19) of the cooler 15, the motor 1, and the speed reducer unit 2 are connected with the connecting bolts 7, thereby completing the mounting of the cooler 15. On the other hand, the cooler 15 can be detached from the motor 1 and the speed reducer unit 2 by loosening the connecting bolts 7. Particularly, the cooler 15 can be mounted by using the motor 1 and the speed reducer unit 2 connectable with the connecting bolts 7, without adding special configurations to the motor 1 and the speed reducer unit 2.

Third, a part of the center hole 17 can be used as the communication path 18. Therefore, a configuration of the cooler 15 can be simplified as compared with a case where the communication path 18 is provided at a place different from the center hole 17. Thus, the cost can be further reduced.

Fourth, a configuration of injection and discharge of the cooling medium in the cooler 15 is simple. Specifically, in the embodiment, the inlet 20 and the outlet 21 of the cooling medium for the coolant path 16 are provided on the outer peripheral portion (ring member 19) of the cooler 15, and therefore the cooling medium can be directly injected into the cooler 15 from the outside, and directly discharged from the cooler 15 to the outside. Therefore, a configuration of injection and discharge of the cooling medium can be simplified, for example, as compared with a case where the inlet and the outlet of the coolant are provided on the casing 4 of the speed reducer unit 2 and are brought in communication with the cooler 15. Therefore, the assembly, the processing, and the cost become further advantageous.

Figure 4:
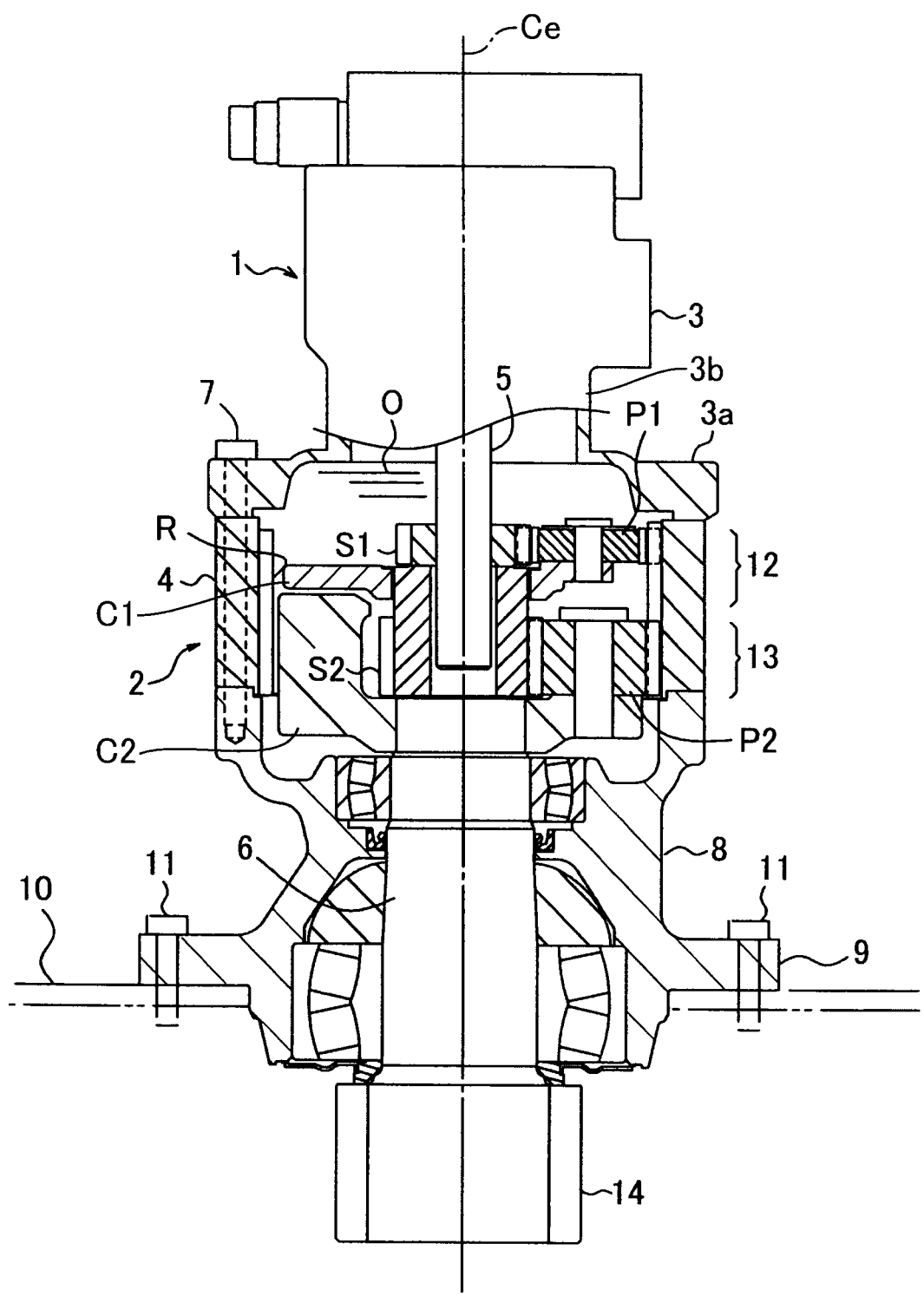
FIG. 4 is a partial cross-sectional side view showing a state where the cooler is detached in the first embodiment.

(iv) It is possible to easily switch between the connection state, in which the motor 1, the speed reducer unit 2, and the cooler 15 are connected as shown in FIG. 1, and the detaching state, in which the motor 1 and the speed reducer unit 2 are connected while the cooler 15 is detached as shown in FIG. 4. Specifically, the motor 1 and the speed reducer unit 2 are detachably connected with the connecting bolts 7. Moreover, the cooler 15 has the bolt through holes 22 detachably connected to the motor 1 and the speed reducer unit 2 with the connecting bolts 7. Therefore, the connection state and the detaching state can be easily switched by screw engagement operation of the connecting bolts 7.

In a case where cooling of the lubricating oil O is not needed, such as a case for cold regions, it is possible to eliminate waste of equipment by switching to a specification where the cooler 15 is not provided (detaching state).

In order to achieve both of the case where the cooler 15 is provided and the case where the cooler 15 is not provided, the following three elements are needed.

First, a length of the motor shaft 5 is set to the size obtained by adding a length corresponding to a thickness of the cooler 15 to an original length necessary for mounting the sun gear S1 of the first-stage planetary gear mechanism 12.

Second, an axial mounting position of the sun gear S1 with respect to the motor shaft 5 is changeable.

Third, in the state where the cooler 15 is not provided, a surplus portion (lower end), located below the sun gear S1 of the first-stage planetary gear mechanism 12, of the motor shaft 5 is inserted into the central portion of the sun gear S2 of the second-stage planetary gear mechanism 13.

Second Embodiment

Figure 5:
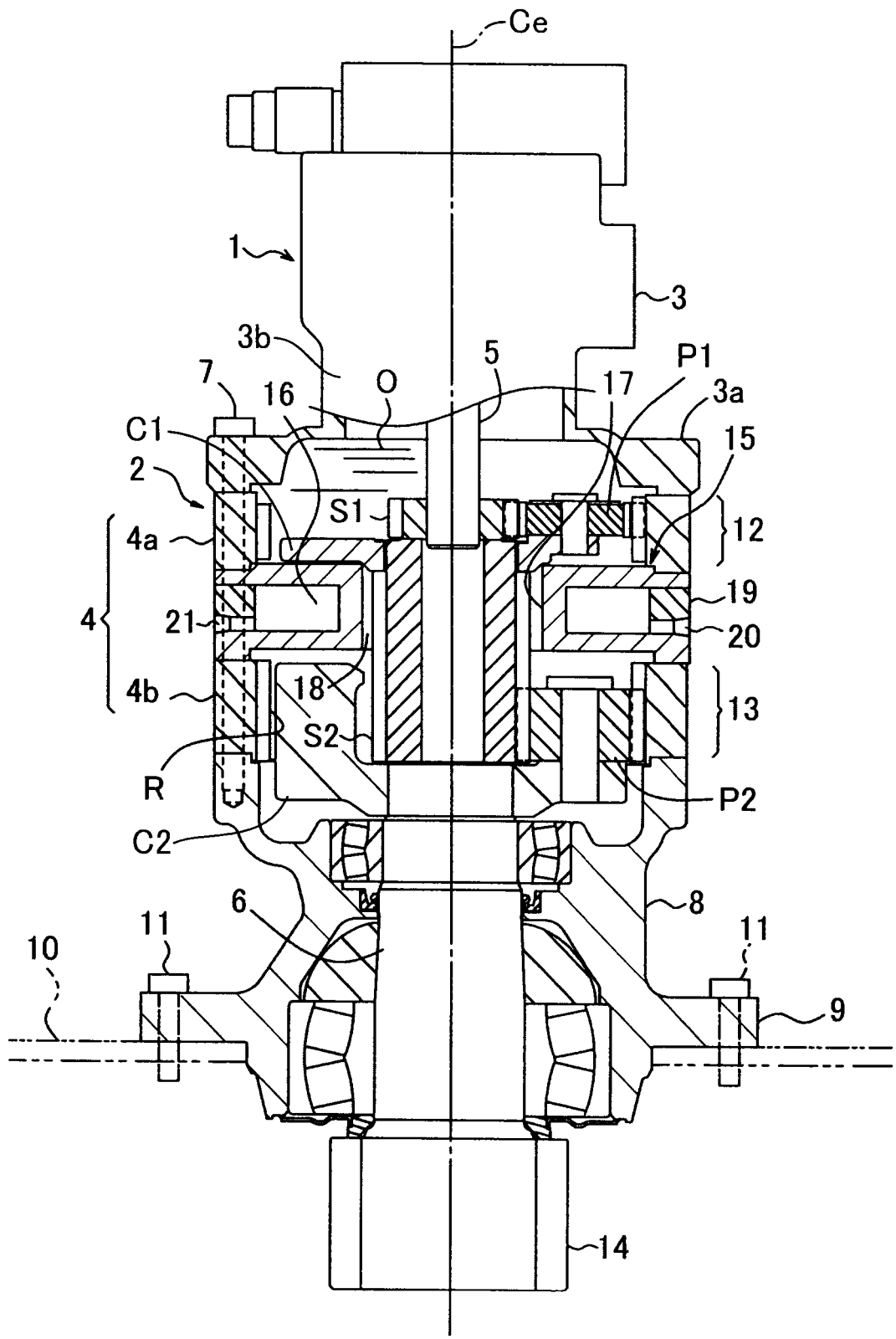
FIG. 5 is a partial cross-sectional side view showing a second embodiment of the present invention.

See FIG. 5

In the following embodiment, the same portions as the first embodiment are denoted by the same reference numerals, and only difference from the first embodiment will be described.

According to a second embodiment, a speed reducer unit 2 has a plurality of stages of planetary gear mechanisms (two-stage planetary gear mechanism in an example in the drawing, and hereinafter described as a case of the two-stage planetary gear mechanism) 12 and 13 arranged in a row in an apparatus-axis direction. Then, a cooler 15 is provided between the adjacent both planetary gear mechanisms 12 and 13.

A configuration of the cooler 15 is the same as that of the first embodiment.

A casing 4 (including a ring gear R) of the speed reducer unit 2 is divided into an upper casing 4a and a lower casing 4b.

Similarly to the first embodiment, the cooler 15 is mounted to the casing 4 with connecting bolts 7 in a state of being held between the upper casing 4a and the lower casing 4b.

According to this second embodiment, the cooler 15 is more deeply immersed in lubricating oil O. Therefore, even in a case where an oil level of the lubricating oil O is lowered to some extent, heat exchange action is reliably performed on both of the upper and lower sides of the cooler 15. Thus, a cooling effect is further enhanced.

Third Embodiment

Figure 6:
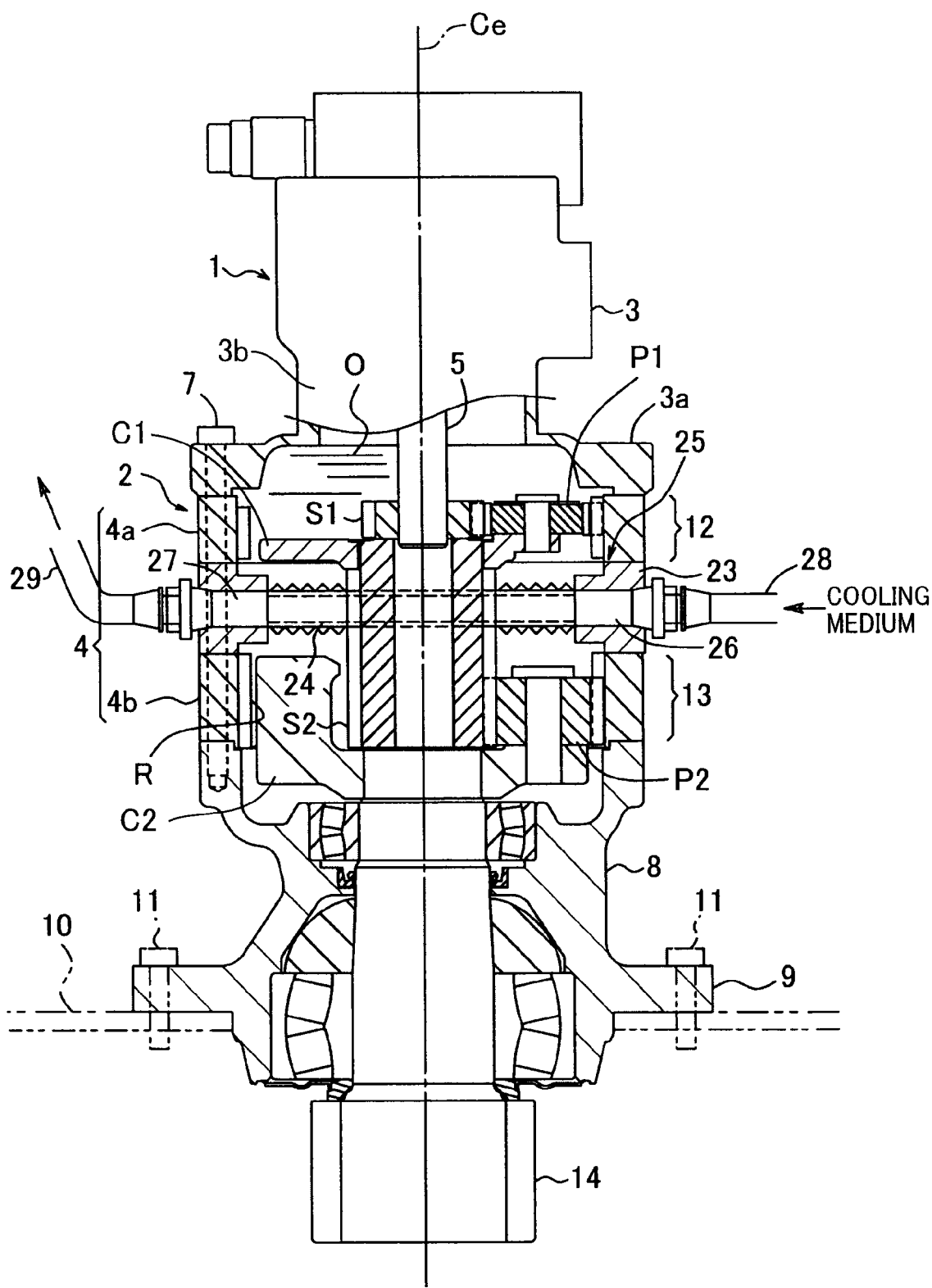
FIG. 6 is a partial cross-sectional side view showing a third embodiment of the present invention.
Figure 7:
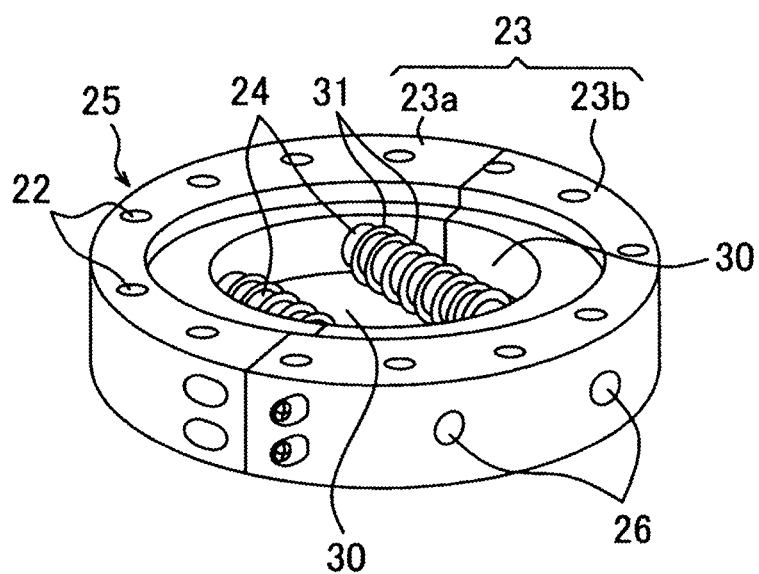
FIG. 7 is an enlarged perspective view showing a cooler shown in FIG. 6.

See FIGS. 6 and 7

A third embodiment and a fourth embodiment described later are similar to the second embodiment in that a cooler is provided between adjacent planetary gear mechanisms. However, the both third and fourth embodiments are also applicable to a configuration in which the cooler is provided between a motor 1 and a speed reducer unit 2, similarly to the first embodiment.

As shown in FIG. 6 and FIG. 7, a cooler 25 according to the third embodiment is provided between a first-stage planetary gear mechanism 12 and a second-stage planetary gear mechanism 13. The cooler 25 includes a ring-shaped flange 23, and at least one pipe bodies 24 (case of two pipe bodies shown in the drawings will be described) provided on an inner peripheral side of the flange 23.

As shown in FIG. 7, the flange 23 has a pair of halved ring pieces 23a and 23b. The respective ring pieces 23a and 23b each have a shape formed by halving a block body, which has a constant thickness in a vertical direction and is formed in a doughnut-shape in plan view, by a plane surface including an axis line Ce. That is, the block body having the constant thickness in the vertical direction and formed in the doughnut-shape in plan view is configured by joining the respective ring pieces 23a and 23b together. The pipe bodies 24 are mounted between these both ring pieces 23a and 23b so as to become bridges between the ring pieces 23a and 23b.

Furthermore, the flange 23 is provided with inlets 26 and outlets 27 leading to the inside of the pipe bodies 24. The inlets 26 are connected to coolant supply pipes 28. Furthermore, the outlets 27 are connected to coolant discharge pipes 29.

The pipe bodies 24 each have a coolant path therein. Furthermore, an outer periphery of each of the both pipe bodies 24 is provided with a plurality of fins 31 over the whole length of each of the pipe bodies 24.

Clearance gaps 30 (denoted with a reference numeral only in FIG. 7) formed between the pipe body 24 and the pipe body 24 and between an inner peripheral surface of the flange 23 and the pipe bodies 24 configure communication paths allowing lubricating oil O to circulate between spaces on both sides in an apparatus-axis direction of the cooler 25.

According to this third embodiment, in addition to basic effects similar to those of the second embodiment, the weight and the cost of the cooler 25 are reduced.

Moreover, heat exchange of the lubricating oil O is performed by utilizing the whole peripheries of the pipe bodies 24 and the pluralities of fins 31, thereby achieving excellent cooling efficiency.

Fourth Embodiment

Figure 8:
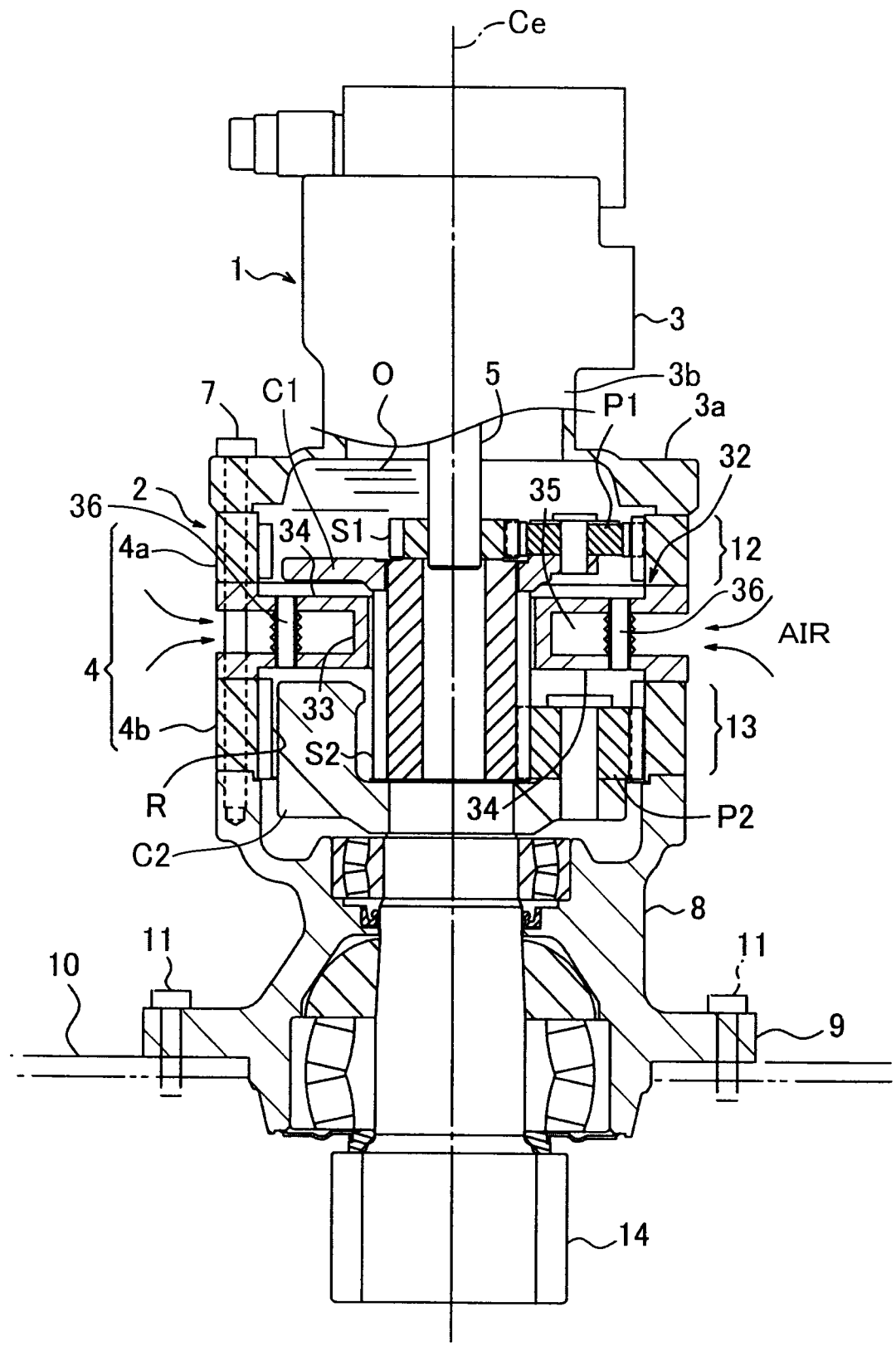
FIG. 8 is a partial cross-sectional side view showing a fourth embodiment of the present invention.
Figure 9:
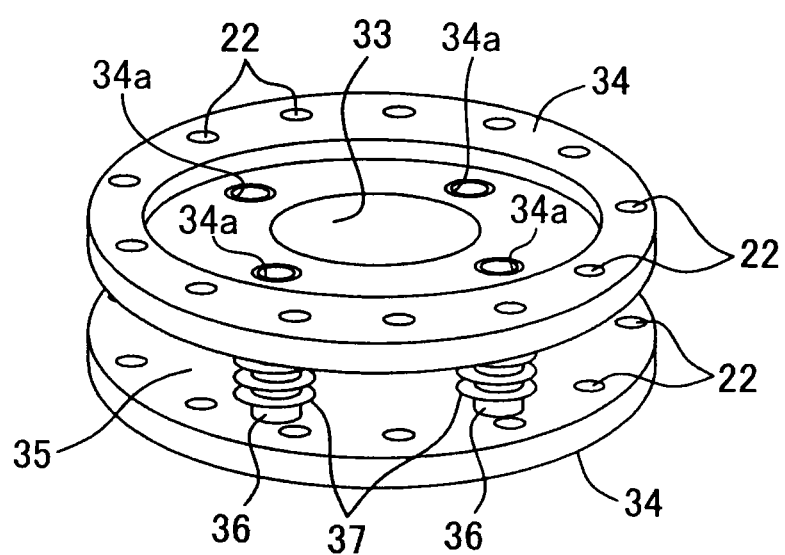
FIG. 9 is an enlarged perspective view showing a cooler shown in FIG. 8.

See FIGS. 8 and 9

In a fourth embodiment, an air-cooled cooler 32 formed in a spool shape is employed.

This cooler 32 includes a short cylindrical trunk portion 33, a pair of upper and lower collar portions 34 provided to protrude from respective sides in an apparatus-axis direction of this trunk portion 33 toward an outer periphery side, and a plurality of tubes 36 (four in the present embodiment: two are shown in FIG. 9) provided between the upper and lower collar portions 34. In a state where the cooler 32 is mounted between both planetary gear mechanisms 12 and 13, a concave portion 35 which serves as a coolant path taking therein the air as a cooling medium is formed around the trunk portion 33 between the pair of collar portions 34. Each of the collar portions 34 is formed with a plurality of communication holes 34a (four in the present embodiment) that communicates between upper and lower spaces of each of the collar portions 34 so as to allow communication with the inside of the tubes 36 described later. The respective communication holes 34a are provided at a plurality of places in a circumferential direction of the trunk portion 33.

The plurality of tubes 36 is provided at a plurality of places in the circumferential direction of the trunk portion 33 to correspond to the aforementioned respective communication holes 34a. The respective tubes 36 each configure a communication path communicating between the spaces on the both sides of the cooler 32 and allowing lubricating oil O to circulate.

Moreover, a plurality of fins 37 is provided on an outer periphery of each tube 36.

The fins 37 are denoted by a reference numeral only in FIG. 9.

According to this fourth embodiment, a cooling medium, and a configuration for injection and discharge of the cooling medium are not needed unlike a liquid-cooled cooler. Therefore, the cooler 32 can be simplified, thereby enabling reduction in cost and weight.

Moreover, a surface area contributing to heat exchange can be increased by the spool shape in which the concave portion 35 is formed between the pair of collar portions 34. Therefore, a high cooling effect can be obtained.

Additionally, the spaces on the both sides in the apparatus-axis direction of the cooler 32 are in communication with each other by the plurality of tubes 36 passing in the concave portion 35. Therefore, the lubricating oil O can move in and out between the spaces on the both upper and lower sides of the cooler 32 through the tubes 36, and is cooled by losing heat to the air inside the concave portion 35 when passing through the concave portion 35. Particularly, according to the embodiment, the plurality of fins 37 is provided on the outer periphery of each tube 36, and hence the heat exchange action is intensified and a cooling effect can be further enhanced.

The above-mentioned specific embodiments mainly include the inventions having the following configurations.

Specifically, the present invention provides a drive apparatus for a construction machine that includes a hydraulic or electric motor having a motor shaft and serving as a drive source, a speed reducer unit having a speed reducer output shaft for receiving rotation force from the motor shaft and transmitting the rotation force to the driven portion, and a casing having lubricating oil injected therein, and transmitting the rotation force of the motor to the driven portion while reducing speed of the rotation force, and a cooler formed with a coolant path through which liquid or gas for cooling the lubricating oil passes as a cooling medium, wherein the motor and the speed reducer unit are provided in a row in an apparatus-axis direction such that the motor shaft and the speed reducer output shaft are arranged along a same line, and the cooler is provided in a row with the speed reducer unit in the apparatus-axis direction in a state where at least a part of the cooler is immersed in the lubricating oil, so as to enable heat exchange with the lubricating oil.

According to the present invention, in the state where at least the part of the cooler is immersed in the lubricating oil so as to enable the heat exchange with the lubricating oil, this cooler is provided in a row with the speed reducer unit in the apparatus-axis direction. Therefore, a surface area contributing to the heat exchange can be increased as compared with a conventional jacket structure in which the heat exchange with the lubricating oil is performed only from an outer periphery side by a coolant path provided on a peripheral wall of a casing. Thus, a cooling effect with respect to the lubricating oil can be improved.

Furthermore, according to the present invention, no coolant path is formed on the peripheral wall of the casing, and hence a diameter of the drive apparatus can be reduced and a space occupied by the drive apparatus as viewed from an axial direction can be reduced as compared with the conventional jacket structure. Thus, the degree of freedom at the time of laying out apparatuses around the drive apparatus is improved, and a conventional problem that tightening operation or loosening operation of mounting bolts with respect to the frame of the construction machine (upper frame in a case of a shovel) is troublesome because the cooler protrudes to the outer periphery is resolved.

Furthermore, as compared with a case of forming the coolant path so as to have the size in a range of a thickness of the casing, a particular molding method such as molding using a core for the coolant path is not needed. Thus, the cooler is easily manufactured, and the cost can be reduced.

The "drive axis direction" means a direction parallel to the same line on which the motor shaft and the speed reducer output shaft are arranged.

Furthermore, the "arranged in a row the speed reducer unit in the apparatus-axis direction" includes not only the meaning that the whole of the speed reducer unit is arranged on one side in the apparatus-axis direction with respect to the cooler, but also the meaning that in a case where the speed reducer unit is divided in the apparatus-axis direction, the cooler is arranged between the divided respective portions, and the meaning that the cooler is housed in the speed reducer unit.

In the drive apparatus, the motor, the speed reducer unit, and the cooler are preferably mounted to a frame provided in the construction machine, in a vertical arrangement where the motor, the speed reducer unit, and the cooler are arranged in a row in a vertical direction such that the aforementioned motor is located at a top.

According to this aspect, the motor, the speed reducer unit and the cooler are arranged in the vertical arrangement in the vertical direction, so that a planar space occupied by the drive apparatus can be further reduced. Therefore, particularly, in a situation where there is not an enough space in a diameter direction while there is an enough constant space in the vertical direction as in a case where the slewing drive apparatus is provided in the shovel, the degree of freedom of layout of apparatuses is improved.

In the drive apparatus, the speed reducer unit preferably has at least a single-stage planetary gear mechanism.

According to this aspect, the planetary gear mechanism which is compact in an axial direction is used. Therefore, even when the cooler is provided on an intermediate portion in the apparatus-axis direction, the whole length does not become extremely large.

In the drive apparatus, the cooler is preferably provided in a state where both side surfaces of the cooler in the apparatus-axis direction are in contact with the lubricating oil so as to enable heat exchange with the lubricating oil.

According to this aspect, the surface area contributing to the heat exchange can be further increased, and hence a cooling effect can be further enhanced.

In the drive apparatus, the cooler preferably has a connecting portion which is detachably connected to at least one of the motor and the speed reducer unit, such that switching between a connection state, in which the motor, the speed reducer unit, and the cooler are connected one another, and a detaching state, in which the motor and the speed reducer unit are connected each other while the cooler is detached therefrom, is enabled.

According to this aspect, the cooler has the connecting portion which is connectable to at least one of the motor and the speed reducer unit. Thus, in a case where cooling is not needed, such as a case for cold regions, it is possible to switch to a specification where the cooler is not provided, and hence it is possible to eliminate waste of equipment.

In the drive apparatus, the cooler is preferably provided between the motor and the speed reducer unit.

According to this aspect, the motor and the speed reducer unit which are detachably connected with bolts are used, so that the cooler can be easily mounted by holding the cooler between the speed reducer unit and the motor and bolting the both.

In this case, in order to add the cooler, a length of the bolt is simply increased. Thus, particular processing for the motor and the speed reducer unit is not needed, and hence a cheap cost is attained.

In the drive apparatus, the speed reducer unit preferably has a plurality of stages of speed reduction mechanisms arranged in a row in the apparatus-axis direction, and the cooler is preferably provided between the adjacent speed reduction mechanisms.

According to this aspect, the cooler is in contact with the lubricating oil on the both sides in the apparatus-axis direction. Therefore, equal heat exchange action is performed on the both sides in the apparatus-axis direction of the cooler, thereby further enhancing a cooling effect.

In the drive apparatus, the cooler is preferably provided with a communication path communicating between spaces on both sides of the cooler in the apparatus-axis direction such that the lubricating oil is allowed to circulate.

According to this aspect, particularly, in a case where the cooler (coolant path) is placed in contact with the lubricating oil on the both sides in the drive axial direction, it is possible to spread the lubricating oil between the spaces on the both sides in the apparatus-axis direction of the cooler. Therefore, lubrication of the speed reducer unit can be inhibited from being blocked by the cooler, and the cooling effect by the cooler can be further enhanced.

In the drive apparatus, an inlet and an outlet of the cooling medium for the coolant path are preferably provided on an outer peripheral portion of the cooler.

According to this aspect, the cooling medium can be directly taken in and out with respect to the cooler from the outside. Therefore, a configuration of injection and discharge of the cooling medium can be simplified, for example, as compared with a case where the inlet and the outlet of the coolant are provided on the casing of the speed reducer unit and are brought in communication with the cooler. Therefore, the assembly, the processing, and the cost become further advantageous.

In the drive apparatus, the cooler is preferably a box body having the coolant path therein and flattened in the apparatus-axis direction.

According to this aspect, the cooler can be formed by the box body. Therefore, assembly of the cooler itself is simplified, and a cheap cost is attained.

In the drive apparatus, the flattened box body is formed with a communication hole communicating between spaces on the both sides of the cooler in the apparatus-axis direction such that the lubricating oil is allowed to circulate, in a state of being mounted to the construction machine.

According to this aspect, it is possible to spread the lubricating oil between the spaces on the both sides in the apparatus-axis direction of the cooler through the communication hole. Therefore, lubrication of the speed reducer unit can be inhibited from being blocked, and the cooling effect by the cooler can be further enhanced.

Furthermore, the communication hole is used also as a hole receiving the motor shaft or the speed reducer output shaft therethrough, so that the configuration is simplified as compared with a case where holes receiving the respective shafts therethrough and the communication hole are provided at different places. Therefore, the manufacturing cost of the cooler can be further reduced.

In the drive apparatus, the cooler preferably includes a ring-shaped flange, and at least one pipe body provided on an inner peripheral side of the flange and having a coolant path therein, and a clearance gap between the flange and the at least one pipe body or a clearance gap between the adjacent pipe bodies preferably communicates between the spaces on the both sides of the cooler in the apparatus-axis direction such that the lubricating oil is allowed to circulate, in a state of being mounted to the construction machine.

According to this aspect, the cooler can be formed by the ring-shaped flange and at least one pipe body. Therefore, the cheap cooler with a light weigh can be provided.

Moreover, the whole periphery of the outer peripheral surface of the pipe body located inside the flange can be used for heat exchange with the lubricating oil, and hence cooling efficiency is excellent.

In the drive apparatus, the cooler preferably includes a short cylindrical trunk portion, and a pair of collar portions protruding from respective ends of the trunk portion in the apparatus-axis direction toward an outer peripheral side, and a concave portion which serves as a coolant path taking therein air as the cooling medium is preferably formed between the trunk portion and the pair of collar portions.

As in this aspect, by employing the air-cooled cooler, the configuration of the cooler can be simplified as compared with a liquid-cooled cooler. Thus, reduction in cost and weight can be attained.

Moreover, the surface area contributing to heat exchange can be increased by the shape in which the concave portion is formed between the pair of collar portions. Therefore, a high cooling effect can be obtained.

In the drive apparatus, the cooler preferably further includes a tube provided between the pair of collar portions, and communicating between the spaces on the both sides of the cooler in the apparatus-axis direction such that the lubricating oil is allowed to circulate.

According to this aspect, the spaces on the both sides in the apparatus-axis direction of the cooler are in communication with each other with the tube. Therefore, the lubricating oil circulates through the tube, so that the cooling effect can be further enhanced.

In the drive apparatus, a plurality of fins is preferably provided on an outer surface of the cooler.

According to this aspect, the cooling efficiency of the cooler can be enhanced by the fins.

Furthermore, the present invention provides a construction machine including the drive apparatus, and a driven portion driven by force transmitted through the speed reducer unit.

The construction machine preferably further includes a frame, to which the motor, the speed reducer unit, and the cooler are able to be mounted in a vertical arrangement where the motor, the speed reducer unit, and the cooler are arranged in a row in a vertical direction such that the motor is located at a top.

According to this aspect, the construction machine further includes the frame, on which the motor, the speed reducer unit, and the cooler are able to be mounted in the vertical arrangement in the vertical direction. Thus, the planar space occupied by the drive apparatus can be reduced. Therefore, particularly, in a situation where there is not an enough space in a diameter direction while there is an enough constant space in the vertical direction as in a case where the slewing drive apparatus is provided in the shovel, the degree of freedom of layout of apparatuses is improved.

INDUSTRIAL APPLICABILITY

According to the present invention, a cooling effect of lubricating oil is enhanced and a manufacturing cost can be reduced while the size is small in a diameter direction.

EXPLANATION OF REFERENCE NUMERALS

Ce Axis line
Lubricating oil
P1, P2 Planetary gear
R Ring gear
S1, S2 Sun gear
1 Motor
2 Speed reducer unit
3 Motor housing
3a Flange
4 Casing
5 Motor shaft
6 Speed reducer output shaft
7 Connecting bolt
10 Upper frame
11 Mounting bolt
12, 13 Planetary gear mechanism
14 Pinion 15 Cooler
16 Coolant path
17 Center hole
18 Communication path
20 Inlet
21 Outlet
23 Ring-shaped flange
24 Pipe body
25 Cooler
26 Inlet
27 Outlet
28 Coolant supply pipe
29 Coolant discharge pipe
30 Clearance gap
31 Fin
32 Cooler
33 Trunk portion
34 Collar portion
35 Concave portion
36 Tube
37 Fin

The invention claimed is:

1. A drive apparatus for a construction machine, comprising:
  a hydraulic or electric motor having a motor shaft and serving as a drive source;
  a speed reducer unit having a speed reducer output shaft for receiving rotation force from the motor shaft and transmitting the rotation force to a driven portion, and a casing having lubricating oil injected therein, the speed reducer unit transmitting the rotation force of the motor to the driven portion while reducing speed of the rotation force, the driven portion being provided in an upper slewing body, a lower propelling body or a winch of the construction machine; and
  a cooler formed with a coolant path through which liquid or gas for cooling the lubricating oil passes as a cooling medium, wherein
  the motor and the speed reducer unit are provided in a row in an apparatus-axis direction such that the motor shaft and the speed reducer output shaft are arranged along a same line,
  the casing of the speed reducer unit includes a peripheral wall surrounding the same line,
  the cooler includes a cooling portion disposed at a position closer to the same line than the peripheral wall, the cooling portion having the coolant path, and
  the cooler is provided in a row with the speed reducer unit in the apparatus-axis direction in a state where at least the cooling portion of the cooler is immersed in the lubricating oil so as to enable heat exchange with the lubricating oil.

2. The drive apparatus for a construction machine according to claim 1, wherein
  the motor, the speed reducer unit, and the cooler are mounted to a frame provided in the construction machine, in a vertical arrangement where the motor, the speed reducer unit, and the cooler are arranged in a row in a vertical direction such that the motor is located at a top.

3. The drive apparatus for a construction machine according to claim 1, wherein
  the speed reducer unit has at least a single-stage planetary gear mechanism.

4. The drive apparatus for a construction machine according to claim 1, wherein
  the cooler includes a first surface facing in an apparatus-axis direction and a second surface facing in the opposite apparatus-axis direction, and is provided in a state where the first surface and the second surface of the cooler are in contact with the lubricating oil so as to enable heat exchange with the lubricating oil.

5. The drive apparatus for a construction machine according to claim 1, wherein
  the hydraulic or electric motor having a motor housing, and
  the cooler has a connecting portion which is detachably connected to at least one of the motor housing of the motor and the casing of the speed reducer unit, such that switching between a connection state, in which the motor, the speed reducer unit, and the cooler are connected one another, and a detaching state, in which the motor and the speed reducer unit are connected each other while the cooler is detached therefrom, is enabled.

6. The drive apparatus for a construction machine according to claim 1, wherein
  the cooler is provided between the motor and the speed reducer unit.

7. The drive apparatus for a construction machine according to claim 1, wherein
  the speed reducer unit has a plurality of stages of speed reduction mechanisms arranged in a row in the apparatus-axis direction, and
  the cooler is provided between adjacent speed reduction mechanisms.

8. The drive apparatus for a construction machine according to claim 1, wherein
  the cooler is provided with a communication path communicating between spaces on both sides of the cooler in the apparatus-axis direction such that the lubricating oil is allowed to circulate.

9. The drive apparatus for a construction machine according to claim 1, wherein
  an inlet and an outlet of the cooling medium for the coolant path are provided on an outer peripheral portion of the cooler.

10. The drive apparatus for a construction machine according to claim 1, wherein
  the cooler is a box body having the coolant path therein and flattened in the apparatus-axis direction.

11. The drive apparatus for a construction machine according to claim 10, wherein
  the flattened box body is formed with a communication hole communicating between spaces on both sides of the cooler in the apparatus-axis direction such that the lubricating oil is allowed to circulate, in a state of being mounted to the construction machine.

12. The drive apparatus for a construction machine according to claim 1, wherein
  a plurality of fins is provided on an outer surface of the cooler.

13. A construction machine comprising:
  the drive apparatus according to claim 1; and
  a driven portion driven by force transmitted through the speed reducer unit, and being provided in an upper slewing body, a lower propelling body or a winch of the construction machine.

14. The construction machine according to claim 13, further comprising a frame to which the motor, the speed reducer unit, and the cooler are able to be mounted in a vertical arrangement where the motor, the speed reducer unit, and the cooler are arranged in a row in a vertical direction such that the motor is located at a top.

15. A drive apparatus for a construction machine, comprising:
- a hydraulic or electric motor having a motor shaft and serving as a drive source;
- a speed reducer unit having a speed reducer output shaft for receiving rotation force from the motor shaft and transmitting the rotation force to a driven portion, and a casing having lubricating oil injected therein, the speed reducer unit transmitting the rotation force of the motor to the driven portion while reducing speed of the rotation force, the driven portion being provided in an upper slewing body, a lower propelling body or a winch of the construction machine; and
- a cooler formed with a coolant path through which liquid or gas for cooling the lubricating oil passes as a cooling medium, wherein
- the motor and the speed reducer unit are provided in a row in an apparatus-axis direction such that the motor shaft and the speed reducer output shaft are arranged along a same line,
- the cooler is provided in a row with the speed reducer unit in the apparatus-axis direction in a state where at least a part of the cooler is immersed in the lubricating oil so as to enable heat exchange with the lubricating oil,
- the cooler includes a ring-shaped flange, and at least one pipe body provided on an inner peripheral side of the flange and having a coolant path therein, and
- a clearance gap between the flange and the at least one pipe body or a clearance gap between adjacent pipe bodies communicates between the spaces on both sides of the cooler in the apparatus-axis direction such that the lubricating oil is allowed to circulate, in a state of being mounted to the construction machine.

16. A drive apparatus for a construction machine, comprising
- a hydraulic or electric motor having a motor shaft and serving as a drive source;
- a speed reducer unit having a speed reducer output shaft for receiving rotation force from the motor shaft and transmitting the rotation force to a driven portion, and a casing having lubricating oil injected therein, the speed reducer unit transmitting the rotation force of the motor to the driven portion while reducing speed of the rotation force, the driven portion being provided in an upper slewing body, a lower propelling body or a winch of the construction machine; and
- a cooler formed with a coolant path through which liquid or gas for cooling the lubricating oil passes as a cooling medium, wherein
- the motor and the speed reducer unit are provided in a row in an apparatus-axis direction such that the motor shaft and the speed reducer output shaft are arranged along a same line,
- the cooler is provided in a row with the speed reducer unit in the apparatus-axis direction in a state where at least a part of the cooler is immersed in the lubricating oil so as to enable heat exchange with the lubricating oil,
- the cooler includes a short cylindrical trunk portion, and a pair of collar portions protruding from respective ends of the trunk portion in the apparatus-axis direction toward an outer peripheral side, and
- a concave portion, which serves as a coolant path taking therein air as the cooling medium, is formed between the trunk portion and the pair of collar portions.

17. The drive apparatus for a construction machine according to claim 16, wherein
the cooler further includes a tube provided between the pair of collar portions and communicating between the spaces on both sides of the cooler in the apparatus-axis direction such that the lubricating oil is allowed to circulate.

* * * * *